(12) United States Patent
Clissold et al.

(10) Patent No.: US 8,392,913 B2
(45) Date of Patent: Mar. 5, 2013

(54) METHOD AND APPARATUS FOR THREADED BACKGROUND FUNCTION SUPPORT

(75) Inventors: David N. Clissold, Austin, TX (US); Madhusudanan Kandasamy, Tamil Nadu (IN); Ranganathan Vidya, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1361 days.

(21) Appl. No.: 12/057,785

(22) Filed: Mar. 28, 2008

(65) Prior Publication Data

US 2009/0249344 A1 Oct. 1, 2009

(51) Int. Cl.
*G06F 9/455* (2006.01)
*G06F 9/46* (2006.01)

(52) U.S. Cl. ............................. 718/1; 718/100
(58) Field of Classification Search .............. 718/1, 102, 718/104; 370/352, 388; 717/116
See application file for complete search history.

(56) References Cited

U.S. PATENT DOCUMENTS

| | | | |
|---|---|---|---|
| 5,261,097 A | 11/1993 | Saxon | |
| 5,778,378 A | 7/1998 | Rubin | |
| 6,105,053 A * | 8/2000 | Kimmel et al. | 718/105 |
| 6,247,025 B1 * | 6/2001 | Bacon | 1/1 |
| 6,249,783 B1 * | 6/2001 | Crone et al. | 1/1 |
| 7,085,853 B2 | 8/2006 | Volkov et al. | |
| 7,304,984 B2 * | 12/2007 | Butler et al. | 370/352 |
| 2001/0034782 A1 * | 10/2001 | Kinkade | 709/219 |
| 2003/0012183 A1 * | 1/2003 | Butler et al. | 370/352 |
| 2003/0028854 A1 * | 2/2003 | Nishida et al. | 716/18 |
| 2003/0033345 A1 * | 2/2003 | Keefer et al. | 709/102 |
| 2003/0167358 A1 * | 9/2003 | Marvin et al. | 709/328 |
| 2004/0031034 A1 * | 2/2004 | Lewis | 718/102 |
| 2005/0066202 A1 | 3/2005 | Evans et al. | |
| 2005/0246685 A1 * | 11/2005 | Braddock | 717/116 |
| 2007/0061788 A1 * | 3/2007 | Dodge et al. | 717/140 |
| 2007/0130568 A1 * | 6/2007 | Jung et al. | 718/104 |

OTHER PUBLICATIONS

David G. Korn, Charles J. Northrup, Jeffery Korn; The New Korn Shell—ksh93; Linux Journal; Jul. 1996; pp. 1-9(retrieved online); Issue #27; Publisher: Linux Journal; U.S.

* cited by examiner

*Primary Examiner* — Chun Cao
*Assistant Examiner* — Phil Nguyen
(74) *Attorney, Agent, or Firm* — David Mims; Robert C. Rolnik

(57) ABSTRACT

The present invention provides a computer implemented method and apparatus for a built-in function of a shell to execute in a thread of an interactive shell process. The data processing system receives a request to execute the built-in function. The data processing system determines that the request includes a thread creating indicator. The data processing system schedules a thread to execute the built-in function, in response to a determination that the request includes the thread creating indicator, wherein the thread is controlled by the interactive shell process and shares an environment of the interactive shell process. The data processing system declares a variable based on at least one instruction of the built-in function. Finally, the data processing system may access the variable.

17 Claims, 3 Drawing Sheets

FIG. 2A - Prior Art

METHOD AND APPARATUS FOR THREADED BACKGROUND FUNCTION SUPPORT

BACKGROUND OF THE INVENTION

1. Field of the Invention

The present invention relates generally to a computer implemented method, data processing system, and computer program product for executing two or more processes concurrently in a data processing system. More specifically, the present invention relates to thread control by a shell process.

2. Description of the Related Art

Most modern computers provide a command line to access operating system commands. In UNIX and POSIX-based operating systems, the command line interface is called a shell. Sometimes the shell is called a command interpreter. As the outer layer of the operating system, the shell cooperates with the kernel, the operating system's inmost layer or core of services.

The shell may operate in an interactive mode that permits a user to edit commands and even write small sequences of steps that command the operating system to process data. In addition, the shell may operate in an automatic mode. The automatic mode permits the shell to execute scripts of multiple commands that may be stored as a file.

Occasionally, a user may require a script or other shell command to execute over a lengthy duration. For example, the UNIX 'tail' command may be used to continuously update the latest lines added to a log. Since a user may run the 'tail' command for a period while the user continues to interact with a shell, the user can operate the 'tail' command in the background. Background processing of UNIX commands permits some parallel execution of the background process along with any foreground interaction with the shell. Data processing systems accomplish this parallelism by creating a second process in response to commands entered that include a reserved character, that is '&', as the final character in the command.

Creating the second process, however, is not without costs. Initially, the operating system locates and executes any configuration files, for example, '/etc/profile' among others. Secondly, the operating system allocates and loads memory with values for common environment variables, such as, $HOME or $ENV. Thirdly, the operating system sets up memory and routines to handle inter process communications with the newly opened process. Such inter process communications include facilities to handle shared memory, synchronization, message passing and remote procedure calls. Many background processes do not require such extensive services, particularly those processes that require no coordination with concurrent processes.

Thus, a need exists to both permit the parallel execution of a script or other program at the command line without causing the performance and memory overhead of creating a new process, as well as respond to a command line syntax that expressly indicates that a parallel execution is requested. New process creation can cause redundant establishment of environment variables. In addition, a benefit would accrue if shell built-in functionality avoided spawning an additional process.

SUMMARY OF THE INVENTION

The present invention provides a computer implemented method and apparatus for a built-in function of a shell to execute in a thread of an interactive shell process. The data processing system receives a request to execute the built-in function. The data processing system determines that the request includes a thread creating indicator. The data processing system schedules a thread to execute the built-in function, in response to a determination that the request includes the thread creating indicator, wherein the thread is controlled by the interactive shell process and shares an environment of the interactive shell process. The data processing system declares a variable based on at least one instruction of the built-in function. Finally, the data processing system may access the variable.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2A shows a prior art environment in which a background process executes in parallel with an interactive shell;

DETAILED DESCRIPTION OF THE PREFERRED EMBODIMENT

Figures 1, 3:
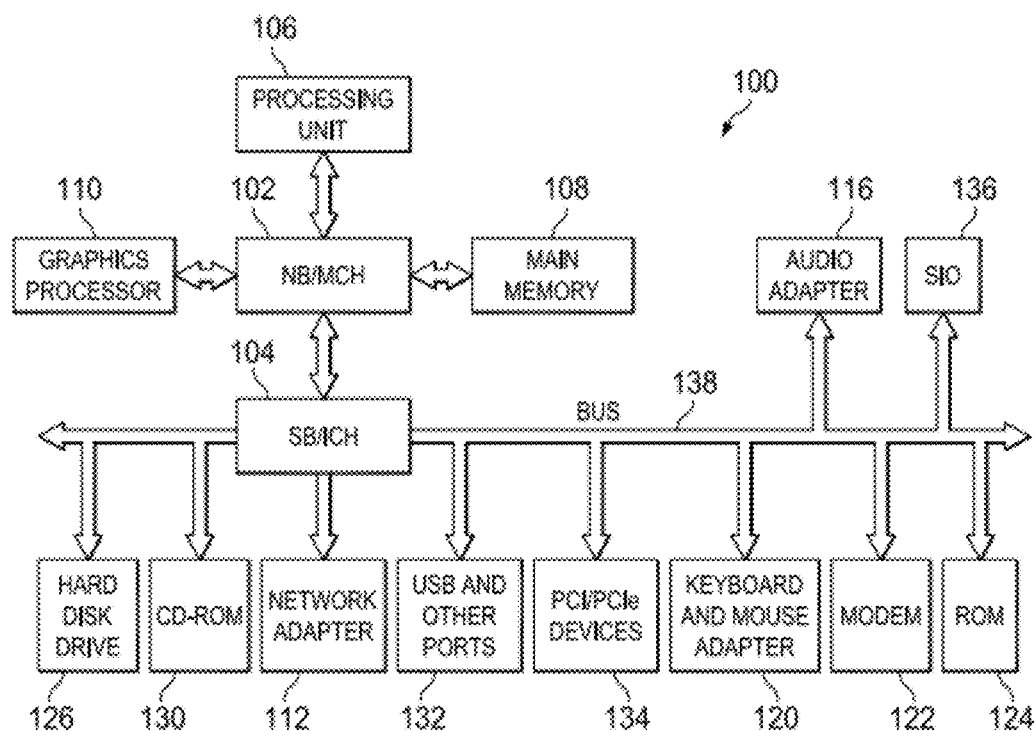
FIG. 1 is a block diagram of a data processing system in accordance with an illustrative embodiment of the invention.
FIG. 3 is a data structure in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The aspects of the illustrative embodiments provide a computer implemented method, data processing system, and computer program product for providing parallel execution of an interactive shell initiated command with the interactive shell. Moreover, the command executes within a thread that is controlled by the process that executes the interactive shell.

FIG. 2A shows a prior art environment in which a background process executes in parallel with an interactive shell. Interactive shell is a process that operates on core 241 of integrated circuit 243. Interactive shell 201 includes memory set up to handle environment variables, such as $HOME 203, and $ENV 205. The environment is an area of memory allocated for variables used by the interactive shell and all threads that have a common process identifier with the interactive shell. In addition, interactive shell 201 uses at least one thread to carry out the instructions of commands entered by a user at the command line. An instruction is a computer readable command that instructs a microprocessor to perform an action. Instructions include, executable machine code, interpretable code, among others. These threads are thread 1 211, and thread 2 213.

A user of the prior art data processing system may execute a command for background processing, for example, "tail my_file &" 251. The data processing system, in response, creates a second process, process C 253 which uses thread 3 254 to perform the steps of the command. In particular, the data processing system may perform steps recorded in the kernel of the operating system to accomplish this feature. The data processing system sets up an independent namespace for process C 253. The namespace includes space for environment variables, such as, $HOME and $ENV. In addition, the data processing system creates supporting data structures to support communication between process A 201 and process C 253, namely, shared memory 255, synchronization 257, message passing 259, and remote procedure calling (RPC) 261, among other things.

Figure 2B:
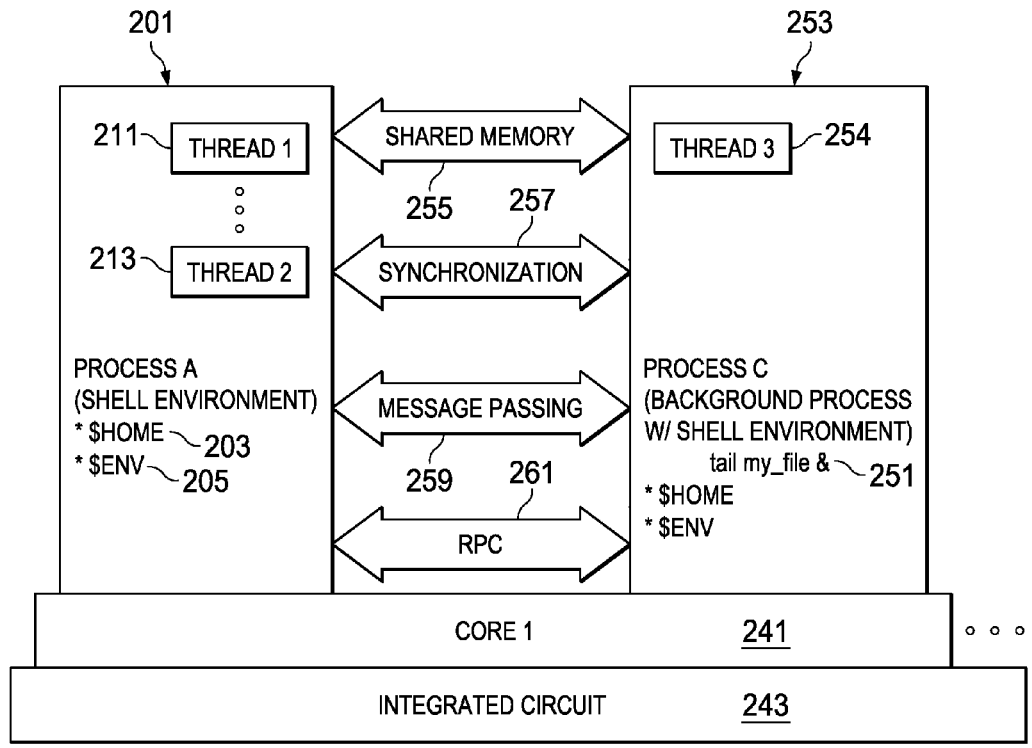
FIG. 2B shows a shell that invokes a background thread in accordance with an embodiment of the invention.
Figure 2B:
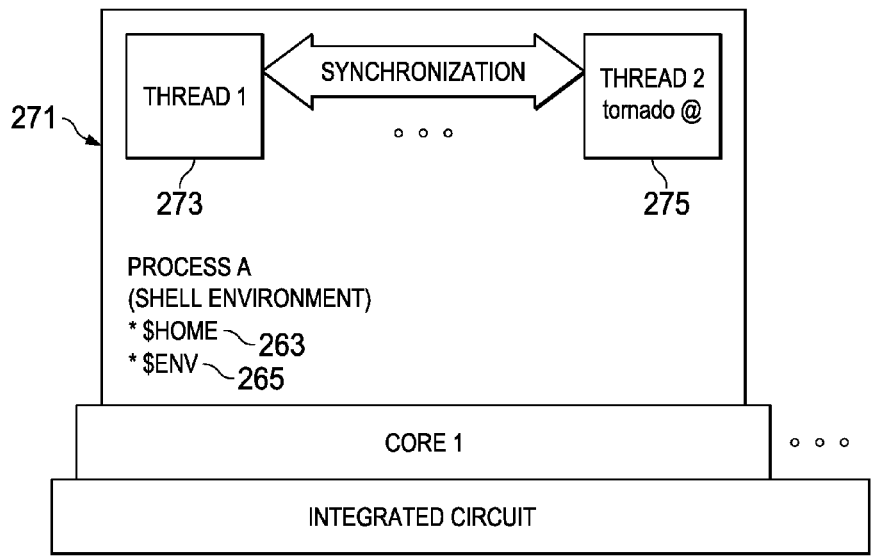

FIG. 2B shows a shell that invokes a background thread in accordance with an embodiment of the invention. Process A 271 may establish and maintain environment variables, such as, $HOME 263 and $ENV 265. Process A 271 relies on thread 1 273 to carry out command line instructions that lack any indication to operate in the background. A user enters a request to execute a built-in function, for example, "tornado @." A built-in function is a function that is compiled or linked in or otherwise stored as functionality to the shell. The built-in function can be a user defined function in a shell script. The built-in function can be a shell built-in, for example, cd, pwd, among other in UNIX and UNIX-like data processing systems. The built-in function may be received by the shell and looked-up such that the name of the function is included among the reserved names for functions and built-in functions. The shell may associate with a name of a built-in function a vector to which code execution is passed in response to invocation of the built-in function.

A user indicates that a built-in function is to be executed by making a request to execute the built in function. The request to execute the built-in function comprises two parts: the name of the built-in function, for example, "tornado"; and command line parameters, in this case, "@." Unlike the prior art, the embodiment of the invention creates a thread within the interactive shell's process. The thread can be thread 2 275.

A thread that executes a built-in function typically relies on variables to assist in modifying and outputting data. The variables can be isolated from other threads or shared among other threads. The thread sets each variable up according to whether the source code instructed a variable to be local to the executing thread or not local.

FIG. 3 is a data structure in accordance with an embodiment of the invention. Data structure 300 includes column for variable names 301 and column for local status 303. Data structure 300 may contain any number of variables. In the example shown, the variables "index" 311 and "windspeed" 313 are initialized to have local statuses of 1 and 0 respectively. Data structure 300 is stored, for example, to main memory 108 of FIG. 1.

Figure 4:
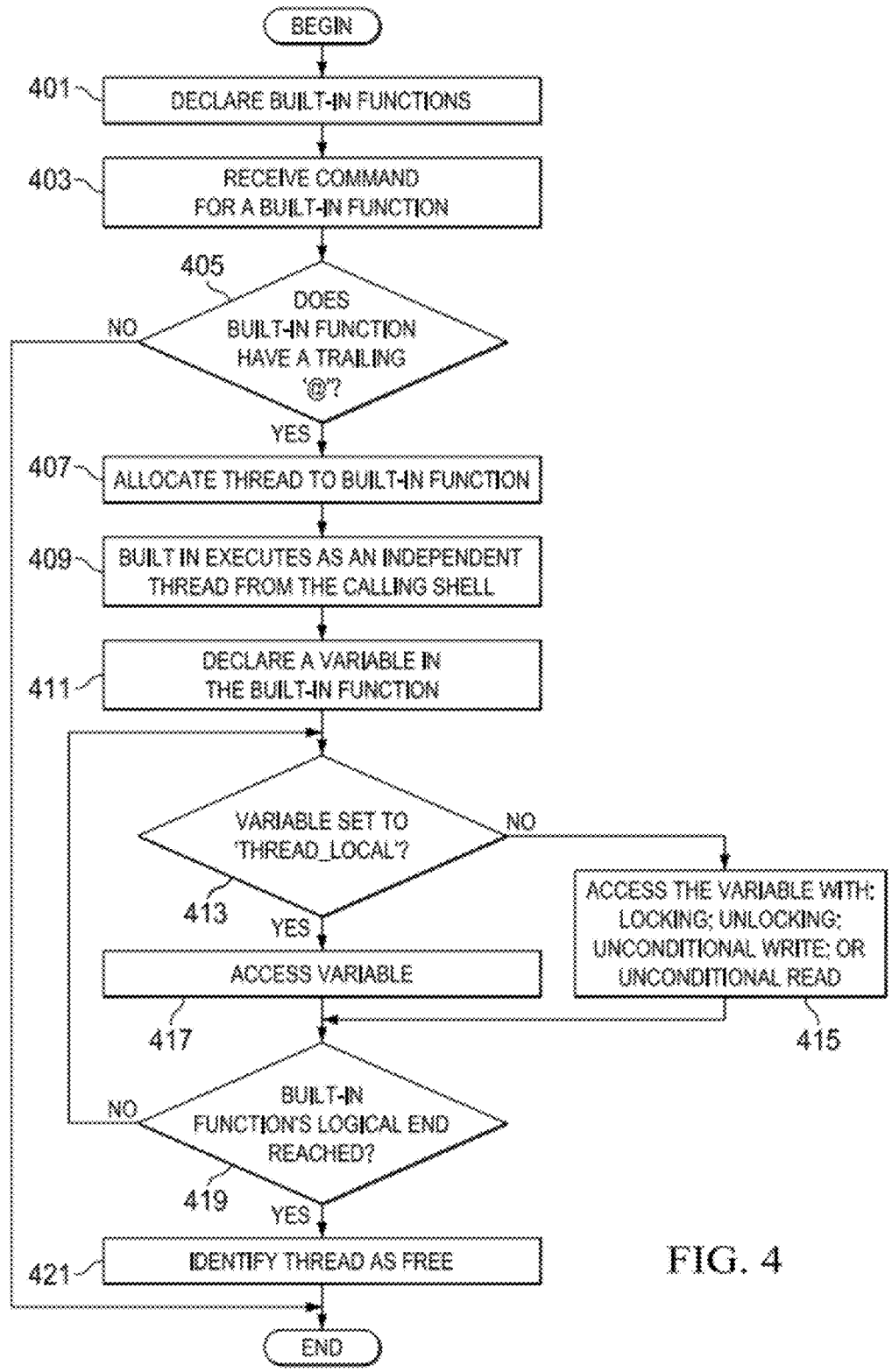
FIG. 4 is a flowchart of steps to execute a built-in function as a background thread within a common process in accordance with an illustrative embodiment of the invention.

FIG. 4 is a flowchart of steps to execute a built-in function as a background thread within a common process in accordance with an embodiment of the invention. Initially, a data processing system performs an initial program load (IPL). The data processing system is, for example, data processing system 100 of FIG. 1. The initial program load can include loading the operating system and initializing an interactive shell process. An interactive shell process is a process that accepts shell commands, interprets such commands, and executes the commands according to any parameters specified with the command. These steps may include declaring built-in functions (step 401). Declaring a built-in function may include loading a built-in function name and a code vector into a table referenced by the operating system. In contrast, an independent executable may be referenced by ad hoc reading of the path variable and traversing the directories identified therein. Such traversing can take longer to perform than the execution of a built-in function that appears in a table. Unlike a built-in function, the independent executable is not referenced in a table. Instead, the independent executable is a file that is read and executed when invoked.

Next, the data processing system receives a request to execute the built-in function (step 403). The request can inform the data processing system to serially execute the built-in function or execute the built-in function in parallel with interactive use of the shell. Next, the data processing system determines whether the built-in function has a trailing thread creating indicator (step 405). A thread creating indicator is a character or characters that appears on a command line to indicate that the built-in function is to be executed by a thread within the process of the interactive shell. In this example, the thread creating indicator is '@'. It is appreciated that other characters may be used as the thread creating character. The thread creating indicator may be a trailing character. A trailing character is a final character entered at a command line, not including a carriage return, line feed character, or other end of line character.

If a built-in function is invoked without a thread creating indicator, the determination of step 405 will be negative. As a result, the processing may terminate thereafter. Such an outcome may cause the data processing system to perform the built-in function serially. In other words, a negative outcome may cause the operating system to devote the processor entirely to the execution of the built-in function before executing additional tasks. If the result of step 405 is positive, the data processing system schedules a thread to execute the built-in function (step 407). The thread is instructions controlled by an interactive shell process, and may share an environment of the interactive shell process when the thread can unconditionally access variables of the environment. A thread is a sequence of steps performed, which may share memory with another thread that operates concurrently on a common microprocessor and within a common process. A process, on the other hand, has its own private set of environment variables as compared to other processes.

The built-in function instructions then executes as a command for an independent thread from the thread of the interactive shell (step 409). Next, the data processing system declares a variable (step 411). A variable is a register or memory allocated for storing data for use by a program. In this case, the program is the built-in function instructions executed by the data processing system. The data processing system may declare the variable to be either thread localized or to be shared among threads of the process. In the first case, a data processing system declares the variable to be localized by, for example, executing code using a keyword, such as "thread_local". The data processing system may subsequently store the variable to a thread_local data area that is not accessible by any other thread of the data processing system.

Consequently, the data processing system determines whether the variable is set to thread local (step 413). The data processing system inspects the built-in function's code for a local indicator. A local indicator associated with a variable declaration is used to indicate that the variable is local and not shared with other threads. In source code, the local indicator can be "thread_local."

Alternatively, the data processing system may not establish a variable for local access by the thread. In this instance, the data processing system may provide for exclusive use of the variable by, for example, interpreting or linking to code that uses an extended form of the UNIX 'set' command. The syntax for the extended 'set' is: "set—L <variable name>", wherein the content of "variable name" is ad hoc according to the name of the variable to be associated with the flag. Such a syntax that includes the "-L" characters may be interpreted to provide a locking mechanism for the variable. Similarly, a built-in function may accomplish an unlocking (or non-exclusive access) by a reciprocal operation of the extended "set" command. The built-in program may unlock using, for example, a syntax of "set—U<variable name>", wherein the content of "variable name" is written in code according to the name of the variable to be unlocked and shared among threads. The flag may perform a dual function in that the flag can also identify a type associated with the variable. A type is an indicator that a variable may be consigned to a set of values that have the same sort of generic meaning or intended purpose.

As a further example of setting a local or non-local status, a flag may be set by using an extended form of the UNIX 'typeset' command. The typeset command may set the flag by using a syntax in the form of "typeset—L<variable name>". Similarly, the typeset command may unset the flag by using a syntax in the form of "typeset—U <variable name>". Whether an extended form of the "set" command or the "typeset" command is used, each well-formed command may set a local status value associated with a variable name as shown, for example, in data structure 300 of FIG. 3.

If the variable is localized to the thread, then the data processing system may access the variable (step 417). However, if the variable is not localized, some measures may be necessary to protect the corresponding memory for the variable from revision and/or access by parallel threads.

If the result of step 413 is negative, the data processing system may provide a mechanism to lock and unlock the memory storing the variable, as well as perform unconditional writes or unconditional reads (step 415). When performing locking on a variable, the data processing system may assign a binary value, such as '1' to indicate that the associated variable is in use. Similarly, when unlocking the variable, the data processing system may assign a binary value, such as '0', to indicate that the associated variable is no longer in use.

It is appreciated that still other data structures may signal that a variable is locked. For example, the shell process may establish a linked list of variables that are private with respect to a specific thread. Alternatively, a shell process may set up a table to track variables and exclude access to them by all threads except the thread to which the variables are assigned.

Each built-in function has a logical program end. The logical end may be reached by completing a final command of the built-in function, for example, a "return( )". A logical end can be a point in the program where an unrecoverable error occurs. In whatever form the logical program end is, the data processing system reaches a built-in function's logical end. Thus, for each command or code line of the built-in function, the data processing system may determine if the built-in function's logical end has been reached (step 419). A negative result to step 419 may cause the data processing system to access further variables. This accessing may permit the data processing system to re-perform step 413 and the steps subsequent to it.

A positive result to step 419, causes the data processing system to identify the thread as free (step 421). A thread scheduler may, accordingly, update a data structure to reallocate processing resources formerly allocated to the thread. Processing terminates thereafter.

The illustrative embodiments permit a data processing system to conserve resources when a built-in function is identified to run in the background. A built-in function specified with the syntax of one or more of the embodiments may be assigned a thread that is a part of the process from which the invoking interactive shell draws resources. Consequently, less memory is consumed by the back-grounded built-in function. Additionally, latency in executing useful instructions of the built-in function may be reduced as compared to the delays incurred by built-in functions of the prior art that required a new process to be created to support background operation of the built-in function.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for a built-in function of a shell to execute in a thread of an interactive shell process, the method comprising:
    receiving a request to execute the built-in function, wherein the request is formatted with a trailing character as a thread creating indicator;
    determining that the request includes the thread creating indicator;
    scheduling the thread to execute the built-in function, in response to a determination that the request includes the thread creating indicator, wherein the thread is controlled by the interactive shell process and shares an environment of the interactive shell process;
    declaring a variable based on at least one instruction of the built-in function;
    accessing the variable, wherein the variable is in an environment controlled by the interactive shell process;
    determining that the variable is not associated with a local indicator;
    determining that variable is coded for access exclusively by the built-in function, wherein the step of accessing comprises locking the variable, in response to a determination that the variable is coded for access exclusively by the built-in function; and
    unlocking the variable prior to freeing the thread.

2. The computer implemented method of claim 1, wherein determining that the variable is associated with the local indicator comprises:
    assigning a type to the variable.

3. The computer implemented method of claim 2, wherein the step of accessing comprises writing to the variable.

4. The computer implemented method of claim 1, further comprising:
    freeing the thread, in response to accessing the variable.

5. A computer implemented method for a built-in function of a shell to execute in a thread of an interactive shell process, the method comprising:
    declaring the built-in function, wherein the built-in function is not an independent executable;
    receiving a request to execute the built-in function;
    determining that the request includes a thread creating indicator;
    scheduling a thread to execute the built-in function, in response to a determination that the request includes the thread creating indicator, wherein the thread is controlled by the interactive shell process and shares an environment of the interactive shell process:
    declaring a variable based on at least one instruction of the built-in function;
    accessing the variable, wherein the variable is in an environment controlled by the interactive shell process
    determining that the variable is not associated with a local indicator;
    determining that the variable is coded for access exclusively by the built-in function,
    wherein the step of accessing comprises locking the variable, in response to a determination that the variable is coded for access exclusively by the built-in function; and
    unlocking the variable prior to freeing the thread.

6. A computer program product for a built-in function of a shell to execute in a thread of an interactive shell process, the computer program product comprising: a computer usable tangible storage device having computer usable program code embodied therewith the computer program product comprising:

computer usable program code for receiving a request to execute the built-in function, wherein the request is formatted with a trailing character as a thread creating indicator;

computer usable program code for determining that the request includes the thread creating indicator;

computer usable program code for scheduling the thread to execute the built-in function, in response to a determination that the request includes the thread creating indicator, wherein the thread is controlled by the interactive shell process and shares an environment of the interactive shell process;

computer usable program code for declaring a variable based on at least one instruction of the built-in function;

computer usable program code for accessing the variable, wherein the variable is in an environment controlled by the interactive shell process;

computer usable program code for determining that the variable is not associated with a local indicator;

computer usable program code for determining that the variable is coded for access exclusively by the built-in function, wherein the step of accessing comprises locking the variable, in response to a determination that the variable is coded for access exclusively by the built-in function; and computer usable program code for unlocking the variable prior to freeing the thread.

7. A computer program product for a built-in function of a shell to execute in a thread of an interactive shell process the computer program product comprising: a computer usable tangible storage device having computer usable program code embodied therewith the computer program product comprising:

computer usable program code for receiving a request to execute the built-in function wherein the request is formatted with a trailing character as a thread creating indicator;

computer usable program code for determining that the request includes the thread creating indicator;

computer usable program code for scheduling the thread to execute the built-in function in response to a determination that the request includes the thread creating indicator, wherein the thread is controlled by the interactive shell process and shares an environment of the interactive shell process;

computer usable program code for declaring a variable based on at least one instruction of the built-in function:

computer usable program code for accessing the variable, wherein the variable is in an environment controlled by the interactive shell process;

computer usable program code for determining that the variable is associated with a local indicator, wherein the step of accessing comprises locking the variable, in response to the determination that the variable is associated with the local indicator; and computer usable program code for unlocking the variable prior to freeing the thread.

8. The computer program product of claim 7, wherein computer usable program code for determining that the variable is associated with the local indicator comprises: computer usable program code for providing a locking mechanism for the variable.

9. The computer program product of claim 8, wherein the computer usable program code for accessing comprises computer usable program code for writing to the variable.

10. The computer program product of claim 6, further comprising: computer usable program code for freeing the thread, in response to accessing the variable.

11. A computer program product for a built-in function of a shell to execute in a thread of an interactive shell process, the computer program product comprising: a computer usable tangible storage device having computer usable program code embodied therewith, the computer program product comprising:

computer usable program code for declaring the built-in function, wherein the built-in function is not an independent executable;

computer usable program code for receiving a request to execute the built-in function;

computer usable program code for determining that the request includes a thread creating indicator;

computer usable program code for scheduling a thread to execute the built-in function, in response to a determination that the request includes the thread creating indicator, wherein the thread is controlled by the interactive shell process and shares an environment of the interactive shell process:

computer usable program code for declaring a variable based on at least one instruction of the built-in function;

computer usable program code for accessing the variable, wherein the variable is in an environment controlled by the interactive shell process;

computer usable program code for determining that the variable is not associated with a local indicator;

computer usable program code for determining that the variable is coded for access exclusively by the built-in function, wherein the step of accessing comprises locking the variable, in response to a determination that the variable is coded for access exclusively by the built-in function; and computer usable program code for unlocking the variable prior to freeing the thread.

12. A data processing system comprising:

a bus;

a storage device connected to the bus, wherein computer usable code is located in the storage device;

a communication unit connected to the bus;

a processing unit connected to the bus, wherein the processing unit executes the computer usable code for a built-in function of a shell to execute in a thread of an interactive shell process, wherein the processing unit executes the computer usable code to receive a request to execute the built-in function;

determine that the request includes a thread creating indicator, wherein the request is formatted with a trailing character as the thread creating indicator;

schedule a thread to execute the built-in function, in response to a determination that the request includes the thread creating indicator, wherein the thread is controlled by the interactive shell process and shares an environment of the interactive shell process;

declare a variable based on at least one instruction of the built-in function; and access the variable, wherein the variable is in an environment controlled by the interactive shell process;

determine that the variable is not associated with a local indicator; and determine that the variable is coded for access exclusively by the built-in function, wherein the step of accessing comprises locking the variable, in response to a determination that the variable is coded for access exclusively by the built-in function; and unlock the variable prior to freeing the thread.

13. A data processing system comprising:
a bus:
a storage device connected to the bus, wherein computer usable code is located in the storage device;
a communication unit connected to the bus;
a processing unit connected to the bus,
wherein the processing unit executes the computer usable code for a built-in function of a shell to execute in a thread of an interactive shell process, wherein the processing unit executes the computer usable code to receive a request to execute the built-in function;
determine that the request includes a thread creating indicator, wherein the request is formatted with a trailing character as the thread creating indicator;
schedule a thread to execute the built-in function, in response to a determination that the request includes the thread creating indicator,
wherein the thread is controlled by the interactive shell process and shares an environment of the interactive shell process;
declare a variable based on at least one instruction of the built-in function; and access the variable, wherein the variable is in an environment controlled by the interactive shell process; and
determining that the variable is associated with a local indicator, wherein in executing the computer usable code to the step of access the processing unit executes computer usable code to lock the variable, in response to a determination that the variable is associated with the local indicator; and unlock the variable prior to executing computer usable code to free the thread.

14. The data processing system of claim 13, wherein in executing computer usable code to determine that the variable is associated with the local indicator the processing unit executes computer usable code to provide a locking mechanism for the variable.

15. The data processing system of claim 14, wherein in executing the computer usable code to access, the processing unit executes computer usable code to write to the variable.

16. The data processing system of claim 12, wherein the processing unit further executes computer usable code to free the thread, in response to executing computer usable code to access the variable.

17. A data processing system comprising:
a bus;
a storage device connected to the bus, wherein computer usable code is located in the storage device;
a communication unit connected to the bus;
a processing unit connected to the bus, wherein the processing unit executes the computer usable code for a built-in function of a shell to execute in a thread of an interactive shell process, wherein the processing unit executes the computer usable code to declare the built-in function, wherein the built-in function is not an independent executable; receive a request to execute the built-in function;
determine that the request includes a thread creating indicator; schedule a thread to execute the built-in function, in response to a determination that the request includes the thread creating indicator, wherein the thread is controlled by the interactive shell process and shares an environment of the interactive shell process; declare a variable based on at least one instruction of the built-in function; and access the variable, wherein the variable is in an environment controlled by the interactive shell process;
determine that the variable is not associated with a local indicator; and determine that the variable is coded for access exclusively by the built-in function, wherein the step of accessing comprises locking the variable, in response to a determination that the variable is coded for access exclusively by the built-in function; and unlock the variable prior to freeing the thread.

\* \* \* \* \*